May 12, 1936.  S. GULICK  2,040,552
DEPTH GAUGE
Filed Jan. 14, 1935  2 Sheets-Sheet 1
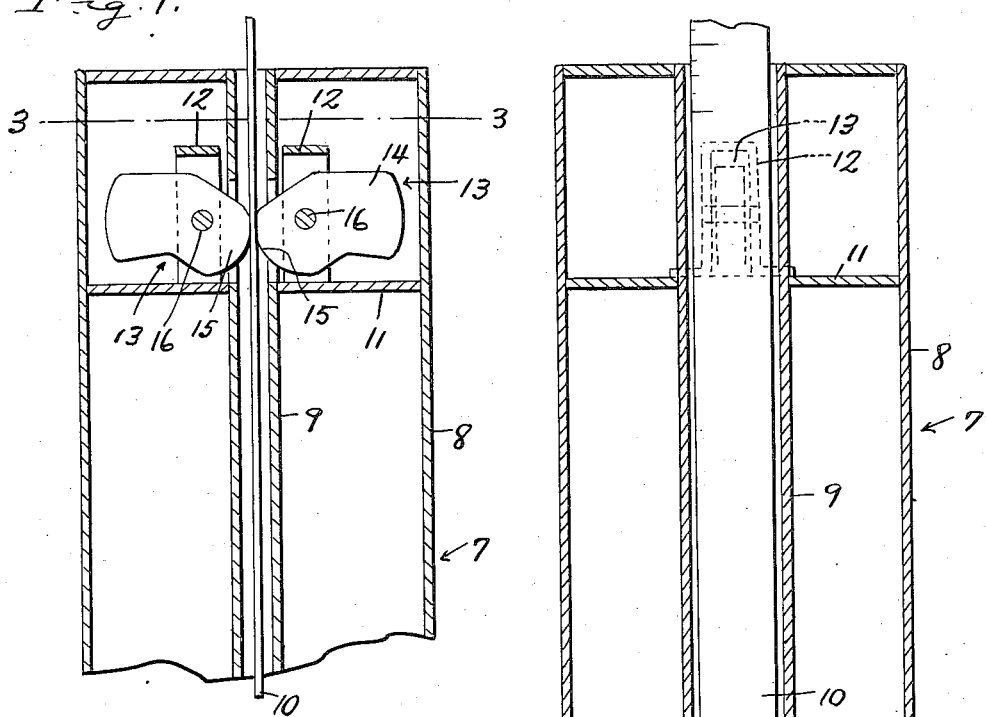
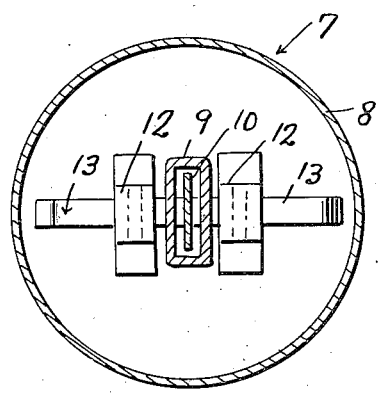
Inventor
Samuel Gulick
By Clarence A. O'Brien
Attorney May 12, 1936.  S. GULICK  2,040,552
DEPTH GAUGE
Filed Jan. 14, 1935  2 Sheets-Sheet 2
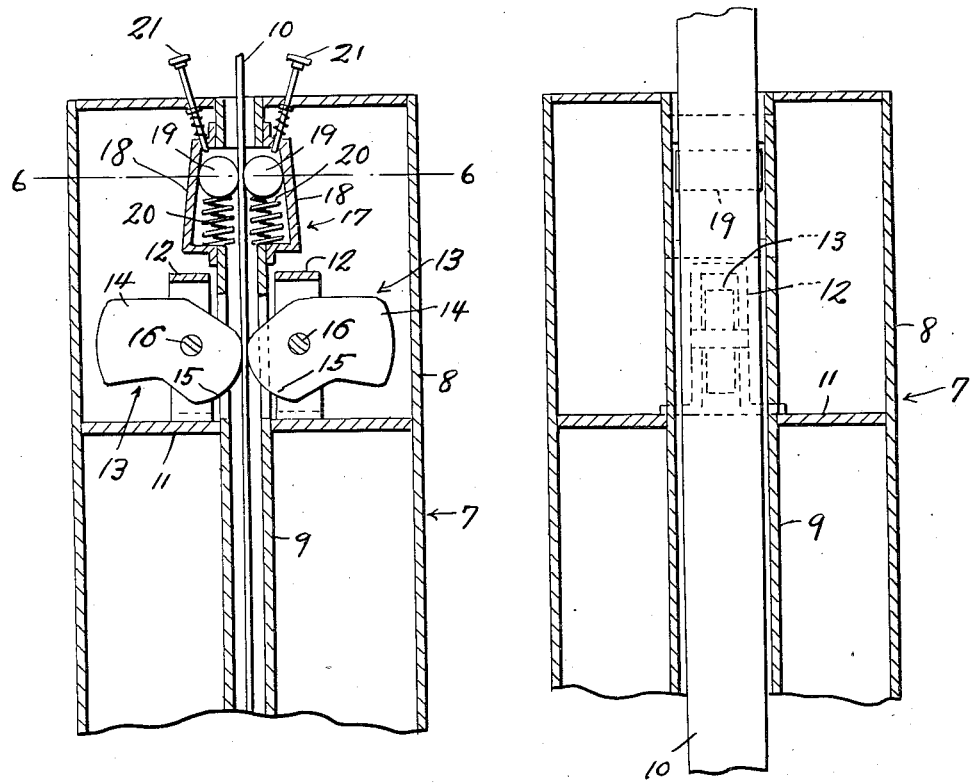
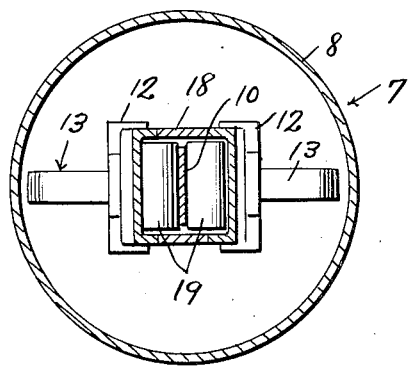
Inventor
Samuel Gulick
By Clarence A. O'Brien
Attorney Patented May 12, 1936

2,040,552

UNITED STATES PATENT OFFICE 2,040,552

DEPTH GAUGE

Samuel Gulick, Grand Coulee, Wash.

Application January 14, 1935, Serial No. 1,738

3 Claims. (Cl. 73—120)

This invention relates to a measuring device for liquid such as may be referred to as a depth gauge and it is especially adapted for use in the oil and gas industry for the purpose of measuring the liquid level in relatively large containers such as storage tanks, tank cars and the like.

In accordance with my conception a practicable type of gauge for accomplishing the desired results satisfactorily is one which embodies a graduated steel tape having a weight or sinker on one end wherein said tape is associated with a clutch equipped float through which the tape passes in a predetermined manner.

Stated otherwise, the principal novelty is predicated upon a float having a central passage therethrough for a measuring tape wherein said passage is provided at a predetermined point with a one-way clutch so that the tape can be lowered through the float until the weight strikes the bottom of the tank, after which upon pulling upwardly on the tape the clutch locks thereon so that the float and tape may be lifted out of the tank as a unit to determine the distance between the sinker or weight and the float and to thereby calculate the approximate depth of the liquid with reasonable accuracy.

Other features and advantages will become more readily apparent from the following description and drawings.

In the drawings:

Figure 1 is a view in section and elevation showing a simple float provided with a duplex clutch with the parts constructed in accordance with the principles of the present invention.

Figure 2 is a view taken substantially at right angles to Figure 1.

Figure 3 is a section on the line 3—3 of Figure 1.

Figure 4 is a view similar to Figure 1 showing an additional roller friction clutch added to the structure.

Figure 5 is a view like Figure 2, that is at right angles to Figure 4.

Figure 6 is a horizontal or cross sectional view taken on the plane of the line 6—6 of Figure 4.

In the drawings the float is indicated as a unit by the numeral 7. This is of suitable proportion and is here shown in the form of a buoyant cylinder 8 formed centrally with a tubular passage 9. This passage is of general rectangular form as shown in Figure 3 and is adapted to serve as a housing and guide for the calibrated or graduated steel measuring tape 10. The tape in practice is provided on its lower end with a weight (not shown) which functions as a sinker to carry the lower end of the tape down through the gasoline, oil or other fluid in the storage tank (not shown). The upper end of the steel tape may be of any appropriate construction and may be embodied in a winding reel casing or the like.

On the interior of the cylinder and adjacent the top is a partition 11 carrying a pair of arch shaped brackets or adapters 12. These serve as mountings for the cams 13. I provide two of these cams and they are of duplicate construction, the outer end 14 is weighted and the inner end is formed into a cam nose 15 fashioned to press against and engage the steel tape. The cams are pivoted intermediate their ends as indicated at 16 in the brackets or mountings. By opposing the two cams they cooperate in providing a simple clutch. Obviously the cam formation is such as to allow the float to be dropped down on the fluid in the tank in a substantially vertical position, at which time the weighted end of the steel tape may be held up close to the bottom of the float. Then the weighted end is lowered in respect to the float or tubular guide 9 until the weight strikes the bottom of the tank. When this is accomplished the tape is pulled upwardly and in so doing the cams 13 bind against the opposite sides thereof to serve as a one-way clutch thus bringing the tape and float up as a unit. By extracting the complete device from the tank it is possible to calculate the distance between the float and the weight and to thereby determine the depth of the fluid, that is the approximate fluid level. This type of a measuring float and tape is far more satisfactory than the crude methods now used wherein it is generally considered sufficient to simply drop the tape down into the fluid and to determine the water mark so to speak and to extract it and then ascertain the depth of the fluid.

Under certain conditions where heavy oil is being measured an oil film forms on the surface of the tape and it is difficult for the cams to take a proper hold on the tape. Under these circumstances it is desirable to add in an extra clutch or tape grasping device. This is shown in Figure 4 wherein it will be observed that it comprises a horizontal housing or casing 17 of general box-like form having tapered side walls 18 which serve to bind the rollers 19 against opposite sides of the tape when the rollers are forced up into the top portion of the housing. The rollers are normally elevated to a predetermined position through the agency of the spring 20. It is obvious however, that this provides an initial friction grip of the rollers on opposite sides of the tape and as the tape is pulled upwardly the rollers are lifted up in the housing so to speak and through the instrumentality of the inclined wall 18 they are forced into binding contact with the tape. Sometimes the gripping rollers have a tendency to jam and when this takes place it becomes necessary to force them down against the action of the springs 20. This is accomplished through the instrumentality of spring returned buttons or plungers 21. These are shown in Figure 4 and are conveniently arranged adjacent the top of the float for expeditious accessibility and operation.

Generically, the cams and their attaching brackets, as well as the rollers and their housings may be each referred to as a clutch, in fact, a friction clutch. It follows in a broad sense we have a buoyant float formed with a central tubular passage for a steel tape with clutch means associated with said passage to serve as a one-way clutch allowing the tape to be lowered with relation to the float and to cause it to be lifted up as a unit with the float when the upper end of the tape is grasped and pulled out from the tank (not shown).

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. A liquid depth gauge of the class described, comprising a hollow metal cylinder substantially closed at its opposite ends by flat closing disks having central measuring tape openings formed therein, a centralized tubular tape guide mounted in said cylinder and having its ends extending into alignment or registration with the openings in said disks, opposed walls of said tubular tape guide being formed with oppositely arranged apertures, a pair of rigid companion brackets mounted in the float and disposed diametrically opposite and outwardly of said apertures, and pivoted cam elements carried by said brackets and having their inner cam ends projecting through said apertures into the tape passage for releasing clutch cooperation with a complemental tape, the outer ends of said cam elements being fashioned with counter-weights.

2. A liquid depth gauge of the class described, comprising a hollow buoyant cylinder constituting a float and having tape openings at its opposite ends, a centrally disposed longitudinally elongated tube of general rectangular cross-sectional shape arranged in said cylinder and having its ends fitting into the openings in the ends of the cylinder, a partition mounted in the upper end portion of the cylinder, the walls of said tubular member being formed with opposed apertures adjacent said partition, brackets mounted on the partition near the apertures, and a pair of companion, automatically operable, clutch elements pivotally mounted in said brackets and having their clutch-ends extending through the apertures to engage with a complemental calibrated measuring tape.

3. A liquid depth measuring gauge of the class described comprising a hollow buoyant metallic shell functioning as a float and having a central tube opening through its upper and lower ends, said tube serving as a protective passage and guide for a measuring tape, a measuring tape passing slidably through the tube and beyond the opposite ends of said shell, opposed walls of said tube being formed at predetermined points with complemental apertures exposing said tape, a pair of spring-pressed tape clutching rollers mounted in positions registering with said apertures, cam elements associated with the tube to force the rollers into contact with the tape, manually operable release elements mounted on the float at one end thereof and cooperable with said rollers to disengage the rollers from the tape when desired, the walls of said tube being formed with an additional pair of opposed apertures, supporting brackets mounted in the float in cooperating alignment with the last-named apertures, and a pair of automatically operable tape engaging cams pivotally mounted on said brackets with their cam-ends extending into the tube through the last-named apertures to permit engagement with the adjacent portion of the tape.

SAMUEL GULICK.